US012546846B2

(12) United States Patent
Coyle et al.

(10) Patent No.: US 12,546,846 B2
(45) Date of Patent: Feb. 10, 2026

(54) SYSTEM AND METHOD FOR REALTIME INTERFERENCE LOCATION USING WIRELESS NETWORK FIELD MEASUREMENT DATA

(71) Applicant: Verizon Patent and Licensing Inc., Basking Ridge, NJ (US)

(72) Inventors: Timothy E. Coyle, Chicopee, MA (US); Hector Alejandro Garcia Crespo, North Richland Hills, TX (US); Matthew Kapala, North Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 381 days.

(21) Appl. No.: 18/062,771

(22) Filed: Dec. 7, 2022

(65) Prior Publication Data

US 2023/0099746 A1    Mar. 30, 2023

Related U.S. Application Data

(63) Continuation-in-part of application No. 16/896,323, filed on Jun. 9, 2020, now Pat. No. 11,558,132.

(51) Int. Cl.
*G01S 5/02* (2010.01)
*G01S 5/00* (2006.01)

(52) U.S. Cl.
CPC .......... *G01S 5/0215* (2013.01); *G01S 5/0063* (2013.01)

(58) Field of Classification Search
CPC ............................. G01S 5/0215; G01S 5/0063
See application file for complete search history.

(56) References Cited

U.S. PATENT DOCUMENTS

| 2004/0203897 | A1* | 10/2004 | Rogers | H04W 16/18 |
| | | | | 455/446 |
| 2013/0310068 | A1* | 11/2013 | Fischer | H04W 4/02 |
| | | | | 455/456.1 |
| 2020/0127901 | A1 | 4/2020 | Hariharan et al. | |

* cited by examiner

*Primary Examiner* — Natasha W Cosme

(57) ABSTRACT

A system may receive, from a network, an estimate of coordinates of a location of a potential interference source; determine, based in the estimate, whether the system is within a first threshold distance from the location; if the system is with the first threshold distance from the location, obtain real-time interference data from the network; determine, based on the real-time interference data, whether a source of interference exists near a first location that is within a second distance from a second location specified by the real-time interference data; and send a reply that indicates a result of the determination to the network.

20 Claims, 13 Drawing Sheets

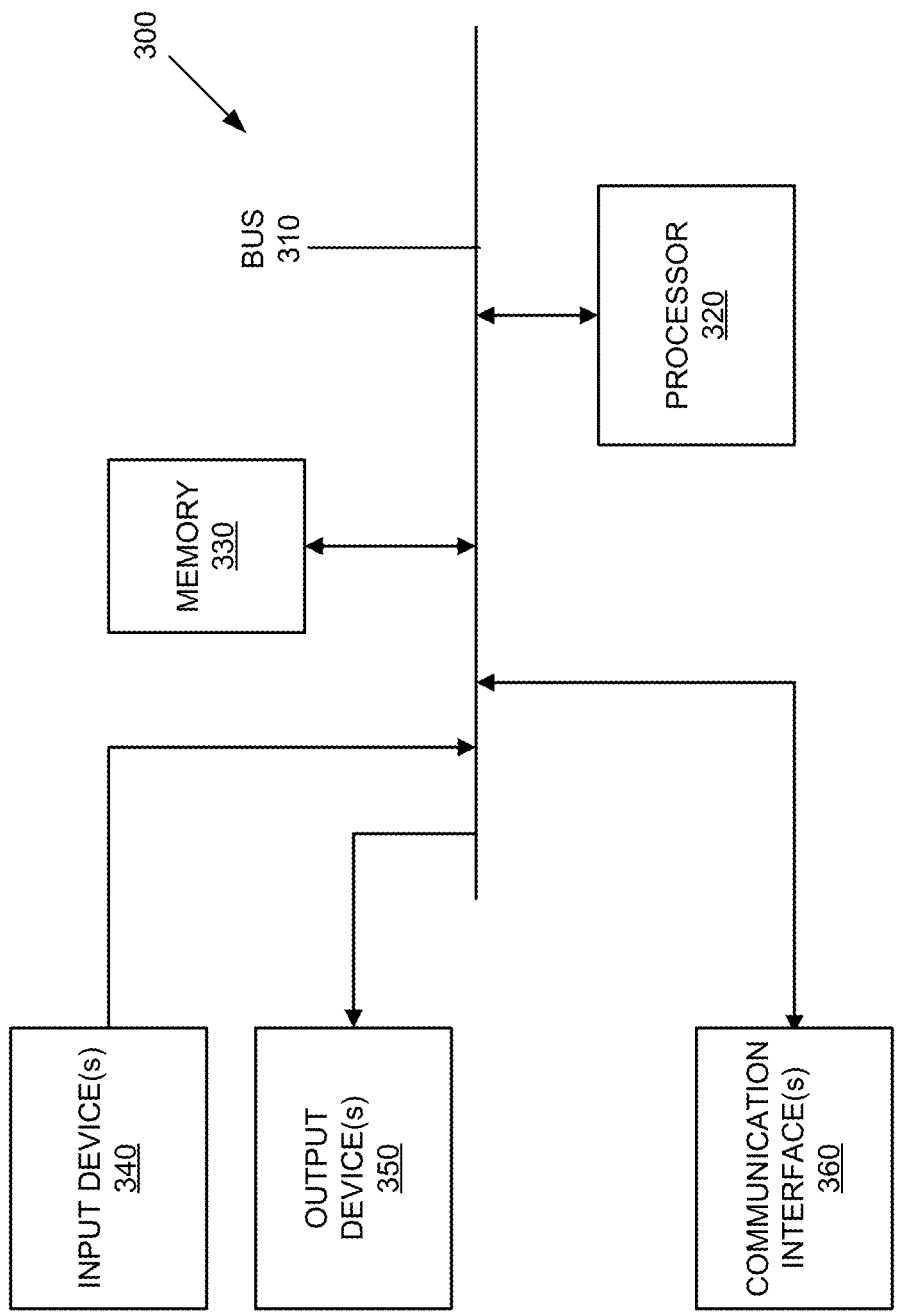

SYSTEM AND METHOD FOR REALTIME INTERFERENCE LOCATION USING WIRELESS NETWORK FIELD MEASUREMENT DATA

CROSS-REFERENCE TO RELATED APPLICATION

This patent application is a continuation-in-part of U.S. patent application Ser. No. 16/896,323, filed on Jun. 9, 2020, and titled "Systems and Methods Identifying a Source of Radio Frequency Interference in a Wireless Network," the disclosure of which is incorporated by reference herein in its entirety.

BACKGROUND

Wireless telecommunications networks may operate on portions of the radio frequency (RF) spectrum. In some situations, interference may be caused in such a way that is detrimental to the performance of a given wireless telecommunications network. For example, external interference may occur when a device external to the network site transmits a signal in a spectrum that overlaps the RF spectrum of the network. In some instances, interference events are irregular, affecting sites on a particular day of the week or specific business hours, which can make it difficult to identify the cause or source of the interference. Furthermore, the conventional process for identifying a source of interference requires significant human capital and specialized equipment. For example, even after field engineers manage to determine that an interference event is occurring or has occurred for a particular network site, the engineers must physically canvass the area proximate to the network site with a directional antenna to identify fluctuations of the interference levels until the source of the interference is identified.

BRIEF DESCRIPTION OF THE DRAWINGS

FIG. 3A is a block diagram illustrating example components of a computer device according to one embodiment;

DETAILED DESCRIPTION OF EXAMPLE EMBODIMENTS

The following detailed description refers to the accompanying drawings. The same reference numbers in different drawings may identify the same or similar elements. The following detailed description does not limit the invention, which is defined by the claims.

Telecommunications service providers may operate wireless networks (e.g., cellular or other types of wireless networks) at a given set of frequencies (or frequency bands) of the Radio Frequency (RF) spectrum. While these frequencies are often licensed (e.g., by a governmental agency and/or by some other authority) for exclusive use by one entity or operator, some bands may be shared by multiple different entities. For instance, a portion of the RF spectrum may be designated for "shared access," or a portion of the RF spectrum that was previously licensed for access by one entity may be licensed for additional entities. In situations where the same portion of the RF spectrum is licensed for use by multiple entities, the use of the portion of the RF spectrum by one entity may negatively impact the use of that portion of the RF spectrum by other entities.

Figure 1:
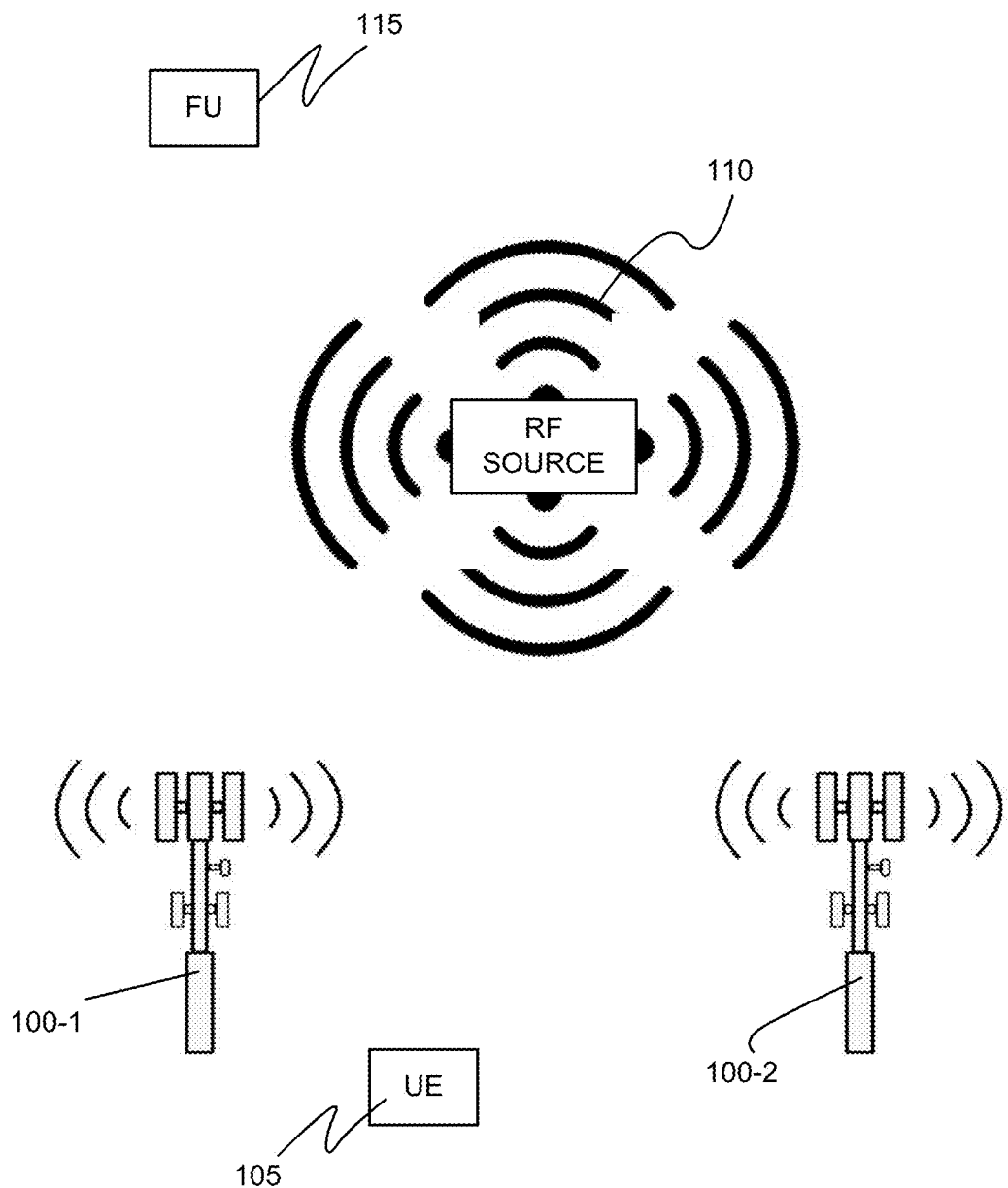
FIG. 1 illustrates an overview of an environment in which systems and methods consistent with embodiments are used.

For example, and as shown in FIG. 1, an entity may cause excessive RF interference (referred to herein simply as "interference" or "noise"). In some cases, there may be multiple sources causing RF interference. For example, assume that a wireless network provider operates wireless stations 100-1 to 100-2 within a particular frequency band, and that wireless stations 100 service a user equipment device (UE) 105. Further assume that another device 110 (also referred to as broadcast source 110), which is associated with another entity, also operates within the same frequency band, and emits an RF interference signal into that band because of intermodulation, excessive power, poor filter design, or for other reasons. Such third-party broadcast sources may negatively impact the operation of wireless station 100 (and/or of UE devices 105 that communicate with wireless station 100, such as mobile telephones, Internet of Things ("IoT") devices, Machine-to-Machine ("M2M") devices, etc.), by introducing RF interference or noise. Because the broadcast source is associated with an entity that is separate from the entity that owns and operates wireless stations 100, it may be difficult to coordinate the operation of wireless station 100 to account for the unexpected and unpredictable interference caused by the broadcast source.

Consistent with implementations described herein, an interference source location determination tool may be provided to quickly and accurately identify a likely location of an interference source. In particular, interference may be determined based on a particular frequency range within which it is occurring. Wireless stations 100 are configured to operate in accordance with various frequency bands and time slots, arranged in physical resource blocks (PRBs). A PRB denotes the most granular aspect of a wireless station's capabilities and includes both a frequency component and a time component. As described herein, interference may be experienced and analyzed on a per-PRB basis.

For example, as described herein, interference-indicating data, such as uplink power measurements data (i.e., uplink signal power) for particular PRBs may be received and stored by the wireless stations 100. When a wireless station experiences external interference, interference-indicating data for the neighboring wireless stations are retrieved and analyzed to determine whether similar interference is perceived by any neighboring wireless stations. Once wireless stations that are not experiencing a similar external interference are filtered out, a heat map indicating a likely location(s) of the interference source may be generated.

For example, when an affected wireless station is 100 is identified (referred to herein as main wireless station 100-1), either autonomously by an interference detection system or via external (e.g., manual) reporting, other wireless stations 100 that are proximate (i.e., geographic neighbors) to the main wireless station 100-1 are examined for similar interference experiences on a particular PRB or PRBs affecting main wireless site 100-1.

Consistent with embodiments described herein, the likely location(s) may be determined by calculating error, such as root mean square error (RMSE) by using Free Space Path Loss (FSPL) calculations based on a number of interference source location guesses. The process is iteratively repeated until minimum values of FSPL are determined. The heat map is generated based on the calculations for each of guessed locations. The generated heat map is provided to field engineers to assist in expediting manual identification of the interference source.

In addition to wireless stations 100 providing interference data, field unit (FU) 115 may identify, when possible, sources of interference. When in operation, field unit 115 may receive information on estimated locations of the sources of interference from the interference detection system. Field unit 115 may verify the presence of interference source at a particular location based on its field measurements (e.g., measurements from a spectrum analyzer that is part of field unit 115).

Figure 2:
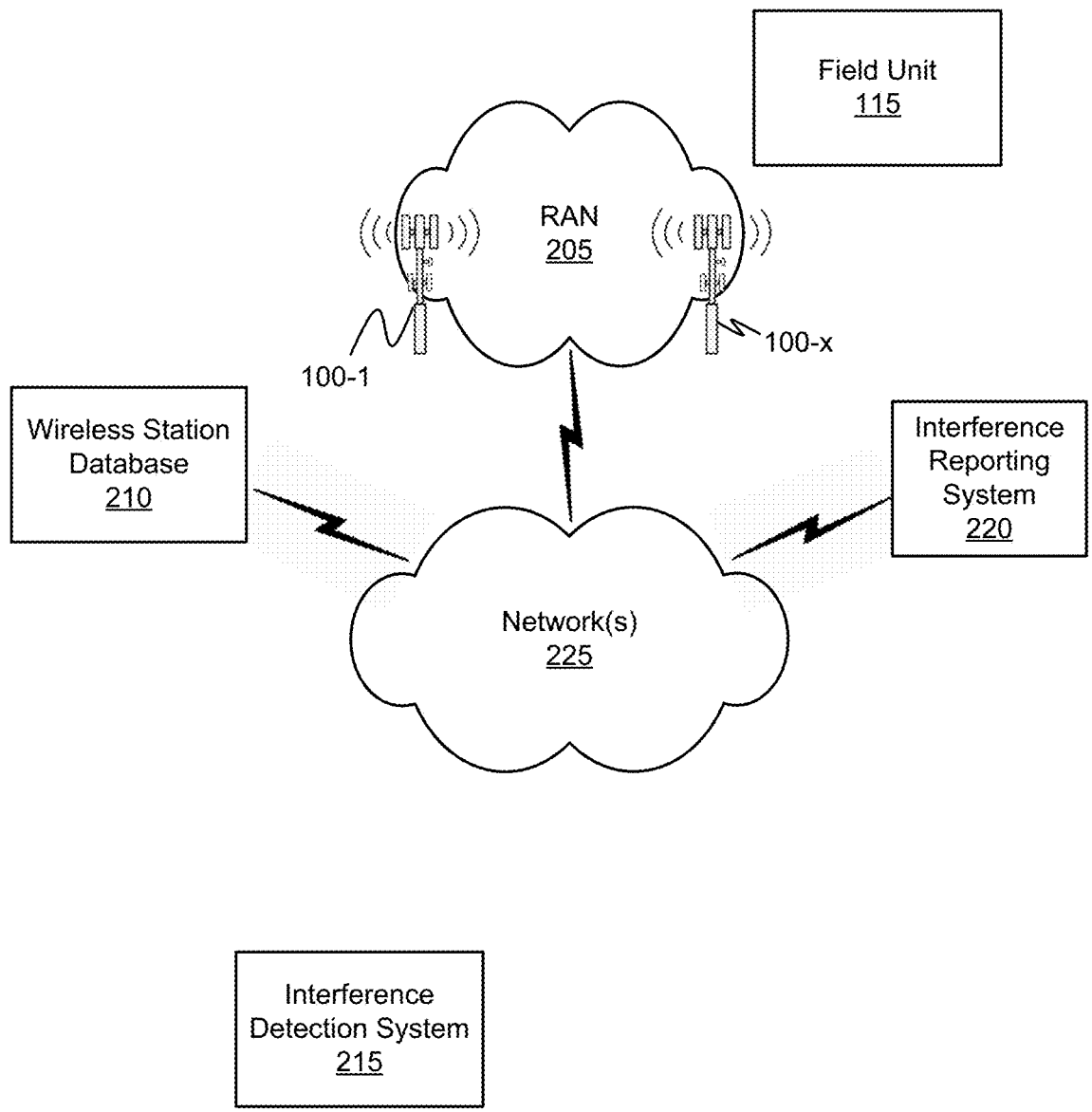
FIG. 2 illustrates an example environment in which one or more embodiments, described herein, may be implemented.

FIG. 2 illustrates an example environment in which one or more embodiments, described herein may be implemented. As shown in FIG. 2, environment 200 may include radio access network (RAN) 205 that includes a plurality of wireless stations 100-1 to 100-*x* (collectively referred to as wireless stations 100 and individually referred to as wireless station 100), a wireless station database 210, an interference detection system 215, an interference reporting system 220, one or more of field unit 115, and one or more networks 225. The number of devices and/or networks, illustrated in FIG. 2, is provided for explanatory purposes. In practice, environment 200 may include additional, fewer, different, or a different arrangement of devices and/or networks than illustrated in FIG. 2.

For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environment 200. Devices of environment 200 may interconnect with each other and/or other devices via wired connections, wireless connections, or a combination of wired and wireless connections. In some implementations, devices of environment 200 may be physically integrated in, and/or may be physically attached to other devices of environment 200.

RAN 205 may include a wireless telecommunications network (e.g., a Long-Term Evolution (LTE) RAN, a Third Generation Partnership Project (3GPP) a Fifth Generation (5G) RAN, etc. As mentioned above, RAN 205 may include one or more wireless stations 100, via which devices (e.g., user equipment (UE), such as mobile telephones, IoT devices, M2M devices, etc.) may communicate with one or more other elements of environment 200. RAN 205 may communicate with such devices via an air interface. For instance, RAN 205 may receive traffic (e.g., voice call traffic, data traffic, messaging traffic, signaling traffic, etc.) from a UE via the air interface, and may forward the traffic to network 225. Similarly, RAN 205 may receive traffic intended for a UE from network 225 and may forward the traffic to the UE via the air interface. RAN 205 may operate at a set of frequencies (e.g., a set of licensed spectra). In some embodiments, one or more of the bands, at which RAN 205 operates, may be shared with an entity other than the entity that owns and/or operates RAN 205.

Wireless station database 210 may include one or more devices (e.g., a server device, or a collection of server devices) for storing wireless station-related information. For example, wireless station database 210 may receive, store, and/or output information relating to various wireless stations 100 in RAN 205. Such information may include, among other data elements, identification information (information identifying wireless stations), geographic location information, sector information (e.g., angle spanned by wireless station 100) for cells, radiation patterns, and performance information relating to performance characteristics of each wireless station 100.

Interference detection system 215 may include one or more devices (e.g., a server device, or a collection of server devices) to determine likely locations of interference sources. For example, interference detection system 215 may identify likely locations of interference sources detected in RAN 205. For example, as briefly described above, interference detection system 215 may generate geographic heat maps that identify the likely locations of sources of interference based on data collected from wireless stations 100 within RAN 205. Consistent with embodiments described herein, the heat map may be generated based on statistical minimization of free space loss calculations at various geographic locations proximate to affected wireless stations. Interference detection system 215 may further take administrative or corrective actions when detecting unique sources of interference, as described in greater detail below.

Depending on the implementation, interference detection system 215 may include databases of interference information received from wireless stations 100 and/or field units 115. The databases may include, for example, records of interference signals from a wireless station 100, a longitude and a latitude of the wireless station 100, a time when the interference signals were detected (e.g., hour, day of the week, date, month, etc.), a power level of the interference signal detected at wireless station 100, etc. In another example, the database may include estimates of the locations of interference signal sources, where the estimates have been determined based on the interference signal measurements from wireless stations 100. In yet another example, the database may include records of field measurements from field units 115. Each field measurement record may include, for example, an identifier associated with the particular field unit 115, location and orientation information for the field unit 115 (e.g., a longitude and a latitude), a time when the measurement was taken (e.g., the second, the minute, the hour, the day of week, the month, and the year), signal power (or interference power) in a frequency band, the orientation of the spectrum analyzer taking the measurement, etc. In some implementations, the database may also include records of inference sources identified based on the combination of data from wireless stations 100 and field units 115.

Interference reporting system 220 may include one or more devices (e.g., a server device, or a collection of server devices) to perform one or more functions described herein. For example, interference reporting system 220 may include messaging systems capable of generating and/or sending messages via network 225. The messages may be emails, text messages, application-specific messages, and/or other types of messages related to alerts that a heat map of possible interference sources has been generated by interference detection system 215. Consistent with implementations described herein, interference reporting system 220 may forward or otherwise notify network personnel (e.g., field engineers) about the identified interference and the generated heat map for use in ascertaining the source of the interference. Interference reporting system 220 may also maintain a history of interference determinations for use in determining patterns.

Field unit 115 may include a spectrum analyzer and a device hosting an interference locator application. The spectrum analyzer may make signal/power measurements in particular spectrums. The interference locator application may communicate with interference detection system 215 and exchange information pertaining to sources of interference. The application may also aid the user (e.g., a field engineer that uses field unit 115 to detect or determine the location of an interference source). Field unit 115 is described below in greater detail with reference to FIG. 3B.

Network(s) 225 may include one or more wired and/or wireless networks. For example, network(s) 225 may include one or more core networks of a licensed wireless telecommunications system (e.g., an LTE core network, a 5G core network, etc.), an Internet Protocol ("IP")-based PDN, a wide area network ("WAN") such as the Internet, a private enterprise network, and/or one or more other networks. One or more of the devices or networks shown in FIG. 2 may communicate, through network(s) 225, with each other and/or with other devices that are not shown in FIG. 2. Network 225 may further include, or be connected to, one or more other networks, such as a public switched telephone network ("PSTN"), a public land mobile network ("PLMN"), and/or another network.

FIG. 3A is a block diagram illustrating example components of a computer device 300 according to one embodiment. UE 105, field unit 115, wireless stations 100, wireless station database 210, interference detecting system 215, and interference reporting system 220 may include or may be included within one or more of computer device 300. As shown in FIG. 3A, computer device 300 may include a bus 310, a processor 320, a memory 330, an input device 340, an output device 350, and a communication interface 360.

Bus 310 includes a path that permits communication among the components of computer device 300. Processor 320 may include any type of single-core processor, multi-core processor, microprocessor, latch-based processor, and/or processing logic (or families of processors, microprocessors, and/or processing logics) that executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, output device 350 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth wireless interface, a radio-frequency identification (RFID) interface, a near-field communications (NFC) wireless interface, and/or any other type of interface that converts data from one form to another form.

Device 300 may perform various operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3A shows exemplary components of device 300, in other implementations, device 300 may include fewer components, different components, additional components, or differently arranged components than depicted in FIG. 3A. Further, in some embodiments, one or more of the components described above may be implemented as virtual components, such as virtual processors, virtual memory, virtual interfaces, etc. Additionally, or alternatively, one or more components of device 300 may perform one or more tasks described as being performed by one or more other components of device 300.

Figure 3B:
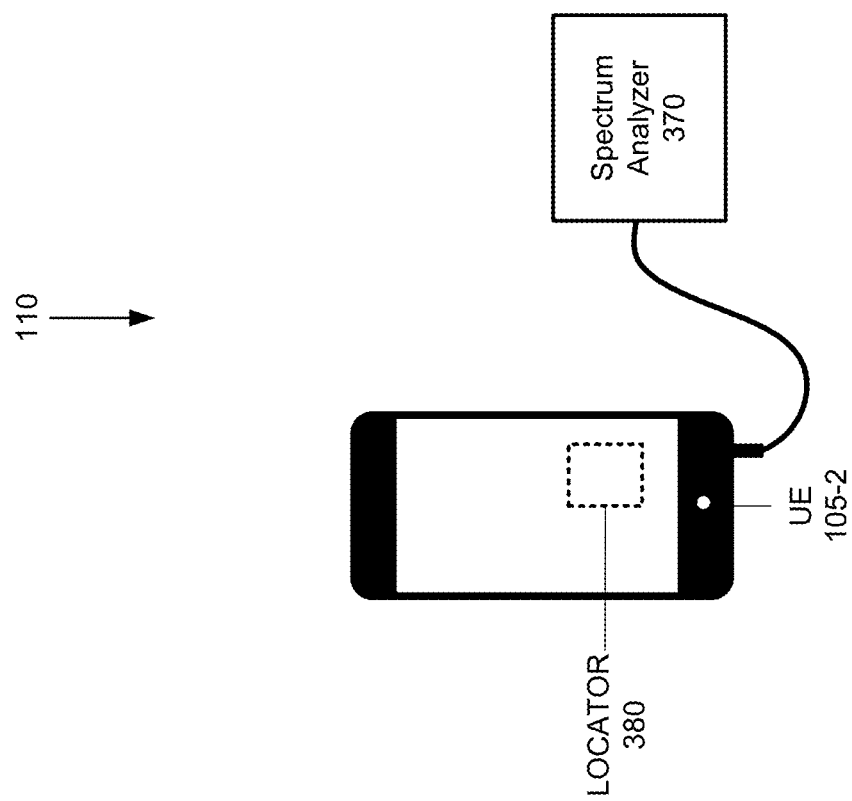
FIG. 3B illustrates example components of a field unit, according to an embodiment.

FIG. 3B illustrates exemplary components of field unit 115, according to an implementation. As shown, field unit 115 may include a spectrum analyzer 370 and UE 105-2 (or UE 105). In some implementations, spectrum analyzer 370 and UE 105 may be integrated into a single device or be composed of multiple devices. Spectrum analyzer 370 may include a device for measuring power in a spectrum. In some implementations, spectrum analyzer 370 may include an interface via which it can provide its measurement data to another device, such as UE 105. Spectrum analyzer 370 may also provide the direction of its measurement (e.g., azimuth) to the user or of UE 105. Depending on the implementations, spectrum analyzer 370 may accept various commands from another device (e.g., UE 105) via its interface-such as a command to take a measurement, upload the measurement data to the requesting device/application on UE 105, etc.

UE 105 may include a wireless communication device. Examples of UE 105 include: a smart phone; a tablet device; a wearable computer device (e.g., a smart watch); a global positioning system (GPS) device; a laptop computer; a media playing device; a portable gaming system; an autonomous vehicle navigation system; a sensor, such as a pressure sensor; and an Internet-of-Things (IoT) device. In some implementations, UE 105 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices.

As shown, UE 105 may include an interference locator application 380 (also referred to as locator 380) that a user may use to detect an interference source, locate an interference source, collect interference/signal measurement data, and/or provide the collected data to interference detection system 215. Locator 380 may include one or more components for interacting with a user (e.g., a field engineer), interference detection system 215 (e.g., over a network), and spectrum analyzer 370.

Figure 3C:
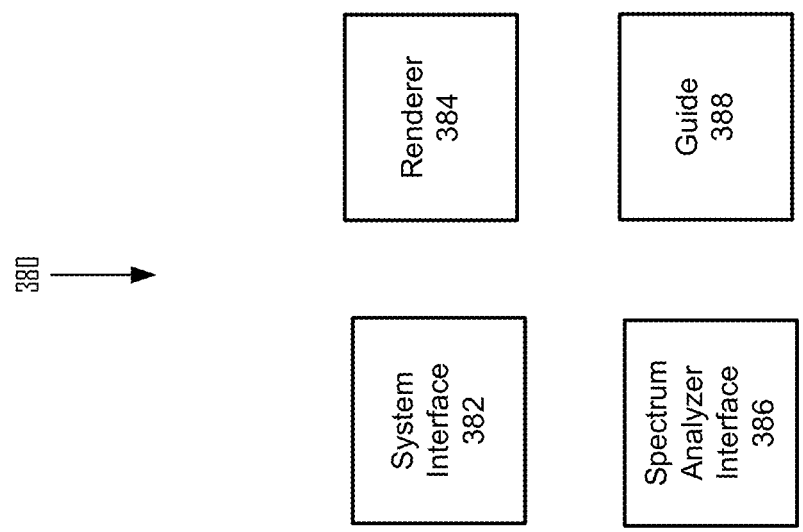
FIG. 3C illustrates example logical components of an interference locator application that may be hosted on a device, according to an embodiment.

FIG. 3C shows exemplary components of locator 380. As shown, locator 380 may include a system interface 382, a renderer 384, a spectrum analyzer interface 386, and a guide 388. Depending on the implementation, locator 380 may include additional, fewer, or different components than those illustrated in FIG. 3C.

System interface 382 may permit locator 380 to interact with interference detection system 215. For example, interface 382 may request interference detection system 215 to provide coordinates of the locations of possible sources of interference. In another example, locator 380 may query interference detection system 215 to provide answers to particular questions regarding interference sources (e.g., whether there is an interference at the location of field unit 115). When interference detection system 215 provides its response, based on either static information (information that interference detection system 215 derives from data obtained by wireless station 100) or real time data from wireless stations 100 or field units 115, system interface 382 may handoff the information provided in the response to renderer 384 or to guide 388. In yet another example, system interface 382 may upload, based on commands from guide 388, measurement data collected by spectrum analyzer 370 and UE 105 (e.g., the orientation of spectrum analyzer 370, coordinates of UE 105, the time at which the measurement was taken, the power detected in the specified spectrum by spectrum analyzer 370, an indication of whether an interference source is present at an estimated location identified by interference detection system 215, etc.).

Renderer 384 may display information to the user, via a user interface and/or a UE component (e.g., a display screen of output device 350). For example, renderer 384 may provide menu items. In some implementations, when locator 380 receives information on estimated interference source locations from interference detection system 215, renderer 384 may render a first-person view (or an augmented reality (AR) view) of a street or an environment in which field unit 115 is located, based on the location/orientation information of field unit 115, a map of the area, and/or 3D images of the first-person view of the environment. Render 384 may show, on the display screen of UE 105, the estimated locations of interference sources and the signal strength, in different colors, shades, or geometrical shapes. Based on the rendered images, the user may navigate toward a potential interference source, for example, to take additional field measurements.

Spectrum analyzer interface 386 may permit locator 380 to interact with spectrum analyzer 370. In one implementation, spectrum analyzer interface 386 may issue commands to spectrum analyzer 370 to obtain field measurements at a specified time or at regular time intervals. When spectrum analyzer interface 386 receives the measurement data from spectrum analyzer 370, spectrum analyzer interface 386 may relay or hand-off the data to other locator components, such as, for example, guide 388 or system interface 382. In another example, spectrum analyzer interface 386 may provide the data to renderer 384 to be displayed to the user.

Guide 388 may include logic for controlling the overall behavior of locator 380 (e.g., a behavior of system interface 382, renderer 384, and spectrum analyzer interface 386). For example, guide 388 may cause renderer 384 to display menu items, input boxes, windows, selectable items, etc., and, based on the user input, drive locator 380 to perform tasks that are associated with the user input. For example, upon receipt of user input, guide 388 may cause spectrum analyzer interface 386 to collect measurement data from spectrum analyzer 370; cause system interface 382 to upload the measurement data to interference detection system 215; cause system interface 382 to receive coordinates of interference sources or potential interference sources from interference detection system 215; cause system interface 382 to query interference detection system 215 or to receive replies; cause renderer 384 to display the potential sources of interference on the UE display; enter an interference detection protocol (e.g., have the user follow a particular procedure for determining an interference source); etc.

Guide 388 may permit the user to input information that locator 380 and/or spectrum analyzer 370 may not be able to obtain without user input. For example, guide 388 may provide a mechanism for the user to input an indication of whether there exists an interference source at an estimated location (which was provided by interference detection system 215). The user may be able to determine if a source of interference exists at the location based on visual inspection. If spectrum analyzer 370 does not support a set of APIs for locator 380 to communicate with spectrum analyzer 370, guide 388 may give the user options to input data that the user can read from the display screen of spectrum analyzer 370, such as spectrum analyzer measurement data.

In some implementations, guide 388 may have the capability to manage a set of automated processes without user input. For example, guide 388 may perform, via spectrum analyzer interface 386, automatic collection of measurement data over a specified time interval and transmit the measurement data to interference detection system 215. Guide 388 may permit the user to set various parameters for triggering alarms and/or alerts, such as distance thresholds for alerting the user when the user is close to a source of interference or a power level threshold for alerting the user when spectrum analyzer 370 detects spectrum power greater than the threshold.

Figure 4:
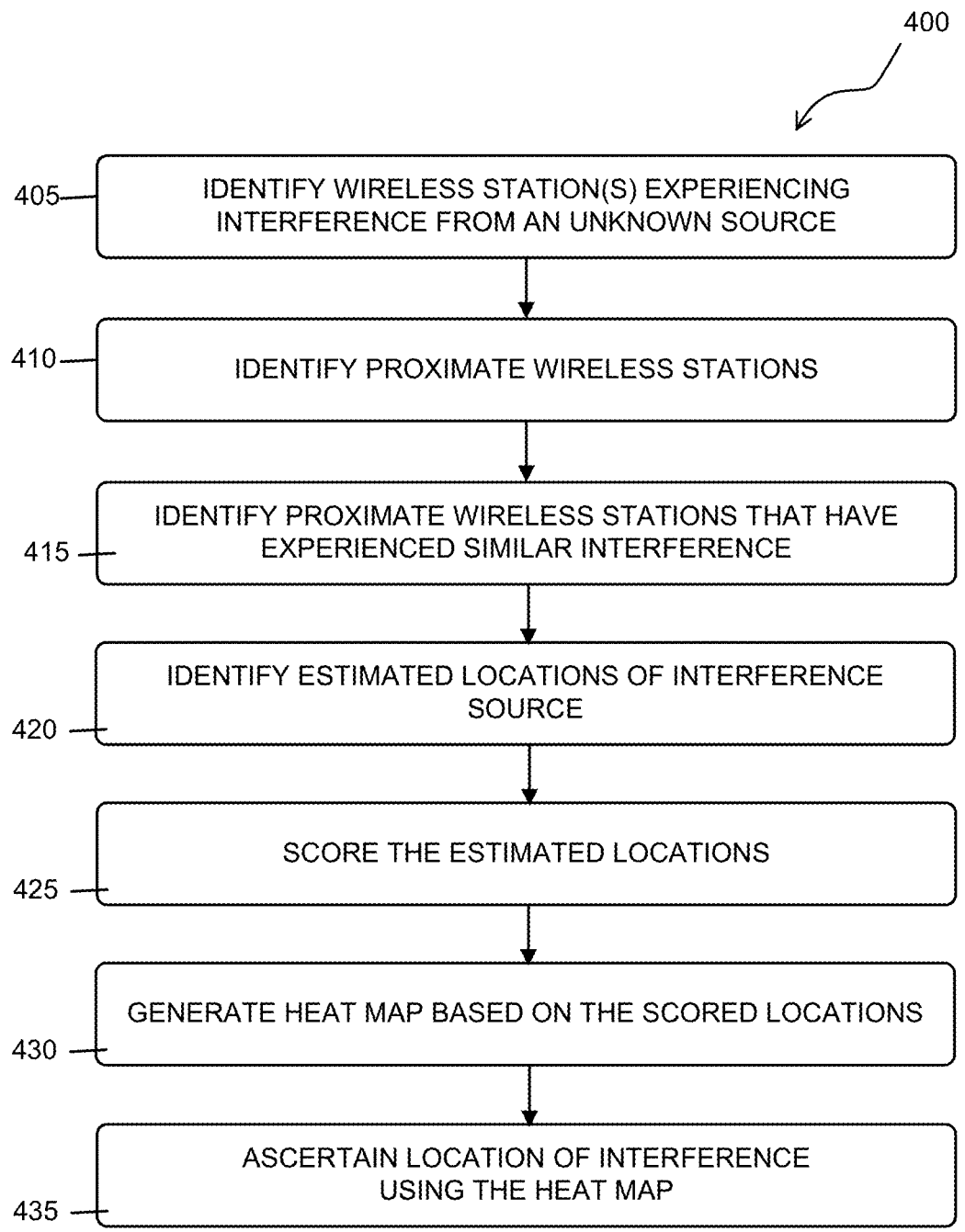
FIG. 4 is a flow diagram illustrating an example process for estimating a location of an unknown interference source, consistent with implementations described herein.

FIG. 4 illustrates an example process 400 for estimating a location of an unknown interference source, consistent with implementations described herein. In some embodiments, process 400 may be performed by interference detection system 215. In some embodiments, process 400 may be performed by, or in conjunction with, one or more other devices or systems, such as wireless station database 210, and/or interference reporting system 220. FIG. 4 is described in conjunction with FIGS. 5-10. Some of these figures include graphs or other graphical representations of data, which may be generated by interference detection system 215. In some embodiments, the figures graphically illustrate calculations, aggregation, analysis, and/or other types of operations that may be performed by interference detection system 215.

Process 400 may include identifying one or more wireless stations that are experiencing unexpected interference, particularly when compared to surrounding wireless stations (block 405). Consistent with embodiments described herein, interference may be determined based on a particular frequency range within which it is occurring. Wireless stations 100 are configured to operate in accordance with various frequency bands and time slots, arranged in physical resource blocks (PRBs). A PRB denotes the most granular aspect of a wireless station's capabilities and includes both a frequency component and a time component. For long term evolution (LTE) wireless stations (e.g., eNodeBs) or 5G New Radio (5G) wireless stations (e.g., gNodeBs), each wireless station 100 may have a set number of PRBs across its available frequency spectrum, each of which comprise approximately 180 KHz of bandwidth. Accordingly, for a wireless station 100 operating in a 10 MHz band, the wireless station will generally include 50 PRBs, each having a discrete frequency and time allocation. Thus, for a given sector (e.g., where "sector" refers to a particular geographic region, which may approximately or precisely correspond to the coverage area of a particular wireless station 100, or a set of wireless stations 100, of RAN 205) and over a given time window (e.g., one minute, one hour, one day, one week, etc.), the received (i.e., uplink) radio power, per PRB, may be measured or otherwise retrieved.

Figure 5:
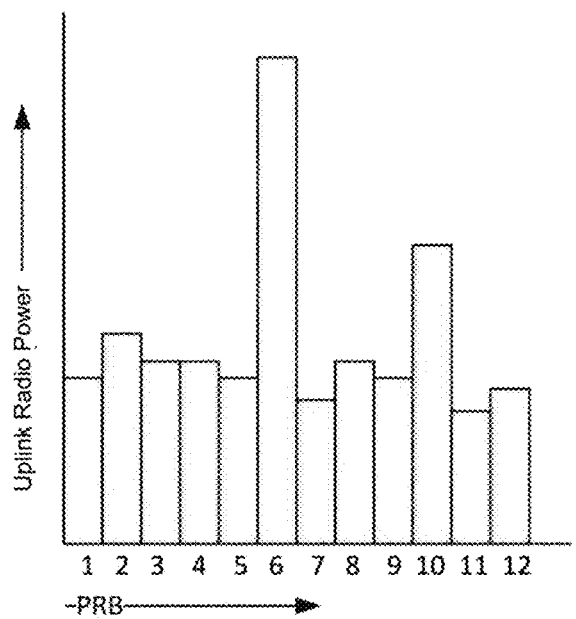
FIG. 5 is a graph of exemplary uplink radio power for a wireless station on a per-physical resource block (PRB) basis.

For instance, FIG. 5 includes a graph that shows an example of uplink radio power, on a per-PRB basis, at a given sector and within a given time window. Each bar on the plot may indicate, in some embodiments, an average of the received uplink radio power measured over a time window. In some embodiments, the plot may indicate a different aspects of the received radio power (e.g., the maximum uplink radio power measured over the time window, the minimum uplink radio power measured over the time window, etc.). As shown, the uplink radio power measured at PRB 6 and PRB 10, at the sector and over the time window, may be relatively high, as compared to the radio power at the other PRBs. The relatively high uplink radio power may indicate a likely interference event.

Consistent with implementations described herein, PRB uplink power measurements or other related measurements for wireless stations 100 may be aggregated or otherwise maintained in wireless station database 210 on a periodic basis, such as every minute, every 10 minutes, every hour, etc. For example, wireless stations 100 may be configured to report various elements of performance metrics (i.e., key performance indicators (KPIs)) on a periodic basis. The reported KPIs may include uplink power measurements for each PRB in the wireless station 100. Interference detection system 215 may monitor the PRB uplink power measurements for each wireless station 100 and may determine instances of likely interference based thereon. For example, continued disrupted (i.e., reduced) PRB uplink power measurements over a period of time may be a strong indication of interference. In some embodiments, autonomous systems, such as artificial intelligence or machine learning systems may be implemented in interference detection system 215 to identify interference-experiencing wireless stations 100 based on the available historical data. In other implementations, interference detection system 215 may receive indications of interference experiencing wireless stations 100 via a manual reporting system. For example, a wireless interference detection system may receive a wireless station identifier and date/time of the interference, the signal/interference power, the time of each measurement, etc.

When an affected wireless station is 100 is identified (e.g., wireless station 100-1), either autonomously by interference detection system 215 or via external (e.g., manual) reporting, wireless stations 100 that are proximate (i.e., neighbors) to the identified wireless station 100-1 (also referred to as the "main wireless station" 100-1) are examined for similar interference experiences (block 410). For example, interference detection system 215 may identify neighboring wireless stations 100 within an initial distance from the main wireless site 100-1, based on the geographic location of the main wireless site 100-1, the PRB(s) that are experiencing the interference, and the timeframe(s) during which the PRB(s) experienced the interference. As described above, wireless station database 210 may include information regarding wireless stations in RAN 205, such as location information (e.g., longitude and latitude information) and performance metrics (e.g., PRB KPIs). Using the collected information regarding wireless stations 100 in RAN 205, interference detection system 215 may ascertain the identities and locations of neighboring wireless stations 100 that are experiencing similar interference during similar timeframes. Interference detection system 215 may record interference signal power, the time of signal/interference detection, etc.

Figure 6:
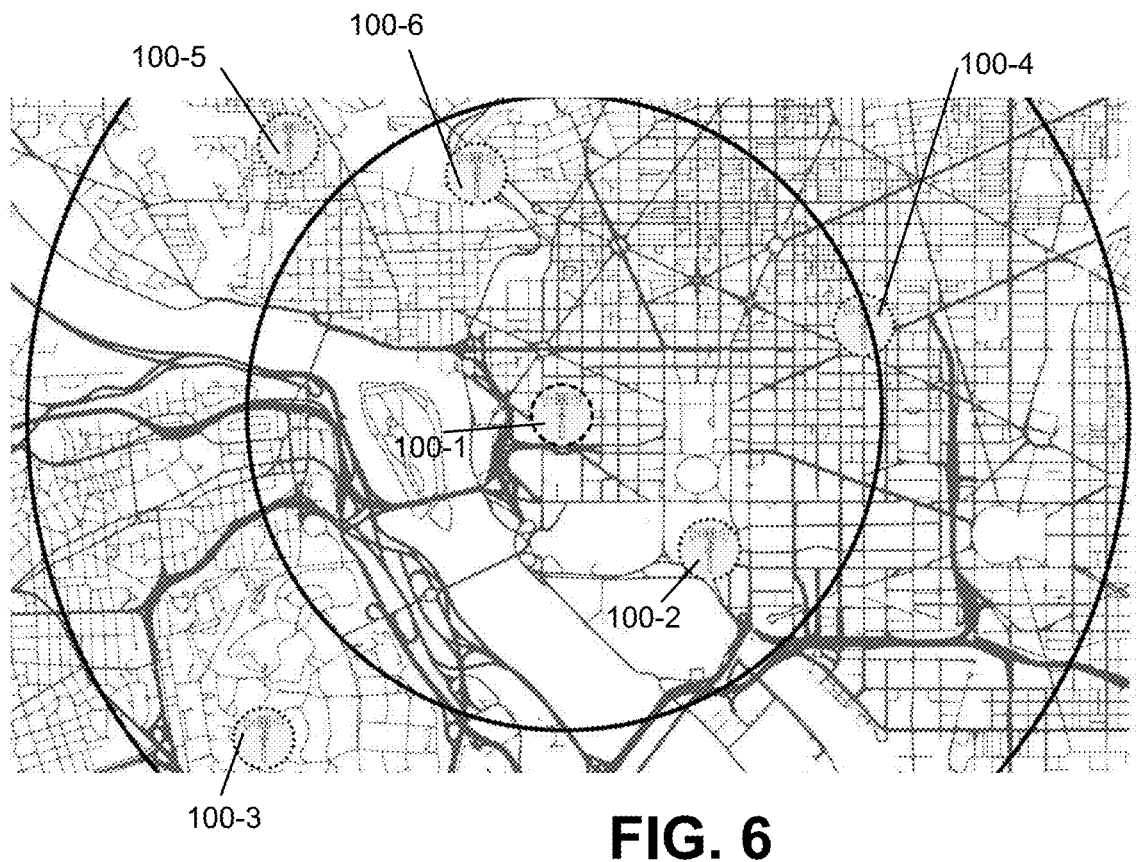
FIG. 6 illustrates an exemplary main wireless station and a number of neighboring wireless stations.

FIG. 6 illustrates the main wireless station 100-1 and a number of neighboring wireless stations 100-2, 100-3, 100-4, 100-5, and 100-6. Assume that main wireless station 100-1 has experienced interference from an unknown source during at least some point in time. Consistent with embodiments described herein, performance data for neighboring wireless stations 100-2 to 100-6 that exhibit a similar interference, may be obtained.

In some implementations, wireless stations 100-2 to 100-6, which may experience interference may be determined in an expanding stepwise manner based on a location from main wireless station 100-1. For example, interference on neighboring wireless stations 100 may be initially determined for neighboring wireless stations that are within distances of about 3-4 kilometers (km) from the initial or main wireless station 100-1. For example, as shown in FIG. 6, wireless stations 100-2, 100-4, and 100-5 are within the initial range. If none of the stations are in the initial range, the range may be expanded incrementally, until a maximum range is reached. For example, the range may be expanded in 2 km increments until at least one other neighbor is determined or a maximum of 10 km from the main wireless station 100-1 is reached, though other smaller or larger increments are contemplated herein. Neighbors at the shortest distance are more likely to experience the same interference as the main site and also offer data for enabling better accuracy when generating a heat map.

Referring back to FIG. 4, after identifying neighboring wireless stations 100, wireless stations 100 that are experiencing similar interference effects are determined (block 415). As described above, external interference typically affects a small number of PRBs at a wireless station 100. To filter out wireless stations that are not experiencing the same interference, the PRB interference-related KPI data (e.g., uplink signal level values) for the candidate wireless stations 100 for the same time period as the main wireless station has detected interference, are retrieved and compared to the corresponding interference-related KPI data on the affected PRBs. For example, using uplink signal levels as an interference-related KPI, values in a −115 dB to −120 dB range generally indicate a low interference signal. In contrast, a high interference signal is usually indicated my uplink signal level ranging from approximately −75 dB to −105 dB. It should be noted that these ranges may be different, depending on the environment and traffic each wireless station is handling.

By way of example, assume main wireless station 100-1 has identified an uplink signal level of −90 dB on PRB 30 and an uplink signal level of −85 dB on PRB 20, as indications of possible interference at PRBs 20 and 30. When identifying relevant neighbors, wireless stations having normal (e.g., −115 dB to −120 dB) uplink signals for PRBs 20 or 30 are excluded or filtered out, even if those wireless stations exhibit higher signals level on different PRBs. To focus the analysis on particular interference signals, data that may indicate other possible interference signals or factors are excluded. For the following discussion, assume that wireless stations 100-2, 100-4, and 100-6 are identified as experiencing interference on the same PRBs during the same timeframe as main wireless station 100-1.

After identifying neighboring wireless stations 100 as sites that may have experienced similar interference as main wireless station 100-1, an analysis of the PRB data for those wireless stations is performed to identify likely locations for the source of the interference (block 420). For example, to determine candidate interference source locations, path loss calculations, such as free space path loss (FSPL) calculations may be performed for each of a plurality of location approximations based on the distance between the wireless station and the selected location approximation, the RF frequency of the PRB under investigation, and the estimated or expected uplink signal value at the wireless station. Minimization calculations may be performed to increase the accuracy of the obtained coordinates. For example, an indication of the accuracy of the selected location approximation may be calculated for each of the wireless stations experiencing interference based on the FSPL calculations and the actual observed uplink power signal level, and the interference source location approximation may be iteratively adjusted until further adjustment does not result in an increased level of accuracy. Although FSPL is provided as an exemplary path loss calculation methodology, it should be understood that additional methods of path loss determination may also be used, consistent with implementations described herein.

Figure 7:
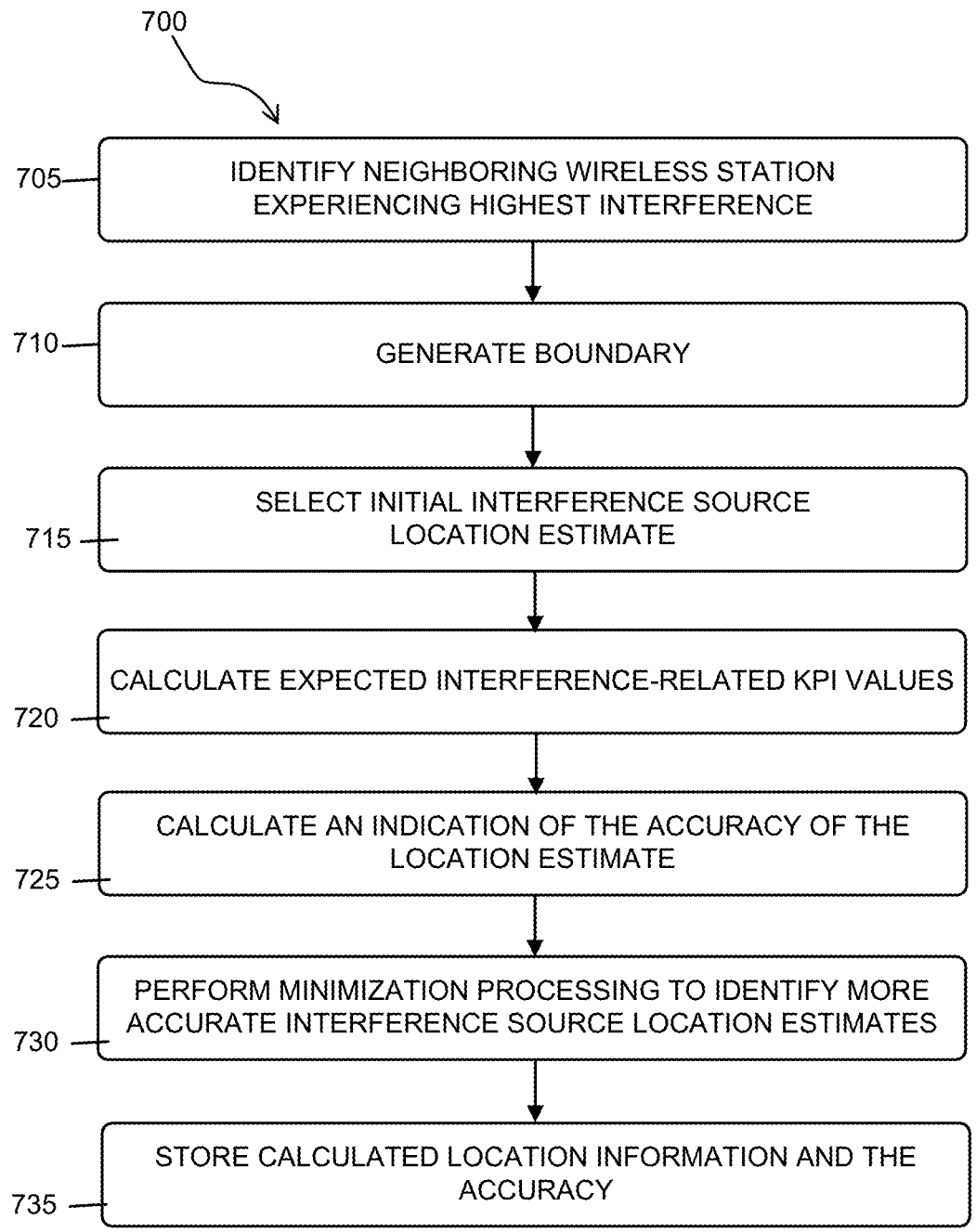
FIG. 7 is a flow diagram illustrating one implementation of a process for identifying candidate interference source locations consistent with embodiments described herein.

FIG. 7 is a flow diagram illustrating one implementation of a process 700 for determining candidate interference source locations consistent with embodiments described herein. Process 700 may be performed by interference detection system 215. However, in some embodiments, process 700 may be performed by, or in conjunction with, one or more other devices or systems, such as wireless station database 210 and/or interference reporting system 220.

Process 700 may include identifying the neighboring wireless station 100 whose PRB data shows the highest interference (block 705). For clarity, the identified wireless station 100 may be referred to as the "strongest correlating station." For example, using the information retrieved from wireless station database 205, interference detection system 215 may compare the uplink power levels for the particular timeframe under investigation for each of the wireless stations identified in block 410. As the result of the comparison, interference detection system 215 may conclude that wireless station 100-1 is the strongest correlating station. The strongest correlating station may not be the main wireless station, since various factors may go into an initial identification of an interference condition, for example the identification may be made manually in response to customer complaints, effects on other network equipment, diagnostics, etc.

Figure 8:
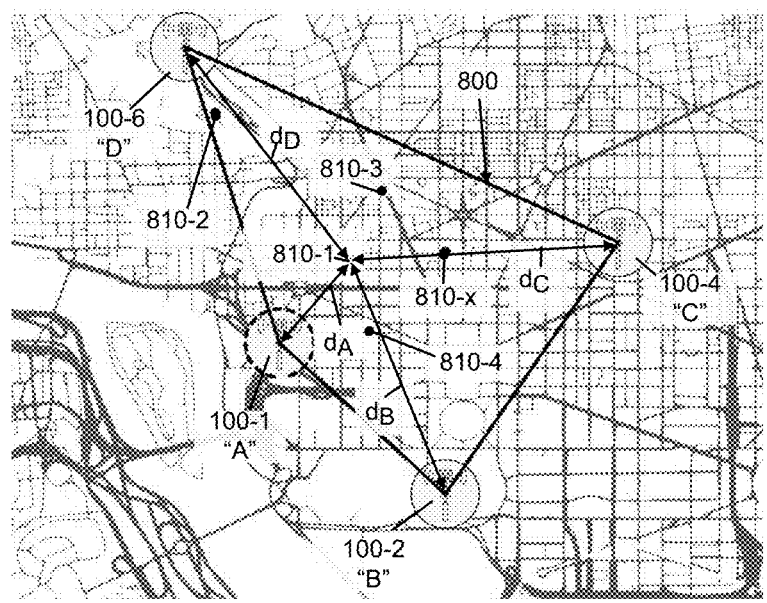
FIG. 8 is a graphical depiction of an exemplary boundary selection for the example of FIG. 6.

Next, the geographic boundary for the likely interference sources is determined based on all possible combinations of the strongest correlating station with all other interference-affected neighbors (block 710), where each combination may correspond to a portion of the boundary. For example, if block 410 above identified three interference-affected wireless stations (100-1 (referred to as A), 100-2 (referred to as B), 100-4 (referred to as C), and 100-6 (referred to as D)), with the strongest correlating station being wireless station A, the remaining combinations would include wireless station A-B, A-C, A-D, A-B-C, A-B-D, A-C-D, and A-B-C-D. FIG. 8 graphically depicts an example of such a boundary selection over the map of FIG. 6. As shown, wireless stations 100-1, 100-2, 100-4, and 100-6 form the vertices along the outer boundary 800 within which the interference source is likely to be found.

Next, an initial interference source location within the geographic boundary is selected (block 715). An exemplary location is depicted in FIG. 8 at location 810-1, within boundary 800. In some implementations, an initial location may be set equal to the location of the strongest correlating station, although any other location with boundary 600 may be selected.

Using the selected location, expected interference-related KPI values for each wireless station on each combination from the initially selected location are determined (block 720). For example, expected uplink signal level values may be calculated using free space path loss as expressed by equations (1) and (2) below:

$$d = 10^{(20\ log_{10}(frequency) - SignalLevel - 27.55)/20} \quad (1)$$

where d is the distance between wireless station and the selected location (in km), frequency refers to the RF frequency (in megahertz) of the PRB under investigation, SignalLevel refers to the estimated or expected uplink signal value at the wireless station (in decibels), and 27.55 is a constant relating to the spherical wave front of the RF signal and the units selected for the computation (e.g., km and MHz) in this example. The distances between the selected location and the respective wireless stations A-D are depicted as da to do in FIG. 8. Solving equation (1) for SignalLevel results in:

$$SignalLevel = 20\ log_{10}(frequency) + 20\ log_{10}(d) - 27.55 \quad (2)$$

Once expected values for uplink signal levels have been calculated for each wireless station 100, these values are compared to the observed or actual values to determine the accuracy of the selected location (block 725). In one implementation, the comparison may include calculating root mean squared error for each interference experiencing wireless station. The root mean squared error may be expressed as:

$$RMSE = \sqrt{\left[\sum_{i=1}^{n}(Expected_i - Actual_i)^2\right]/n}, \quad (3)$$

where n is the number of interference-experiencing wireless stations, expected is the uplink signal level calculated in equation (2), and actual is the observed uplink signal level at the time of the interference, whose value was retrieved from wireless station database 210 at block 410 above. A lower value for RMSE indicates that the expected value is closer to the actual value over the range of data. Although RMSE is described as an accuracy determining methodology herein, other statistical calculations for error may be used, such as mean square error (MSE), mean absolute scaled error (MASE), mean absolute percentage error (MAPE), symmetric MAPE (SMAPE), etc.

A minimization process is performed for RMSE (block 730). For example, interference detection system 215 may iteratively select additional estimated locations and calculate expected and RMSE values for each location, until a minimum RMSE is obtained. Process 700 may result in determining a number of locations and their corresponding RMSE values. Once the RMSE minimization has been performed, the location estimates and the RMSE values for the potential interference sources may be stored in a database. Indications of time intervals during which interference occurs may also be stored along with the location estimates.

Returning to FIG. 4, scores are generated for each of the identified locations (block 425). For example, interference detection system 215 determines a score for use in generating the heat map of possible interference source locations briefly described above. In one exemplary implementation, the scores may be based on the RMSE values as well as a statistical constant reflecting the number or count of wireless stations that are possibly experiencing interference. For example, each score may be weighted 70% based on the number of wireless stations being analyzed and 30% based on the RMSE for the particular location.

Next, a heat map is generated based on the identified locations and their relative scores (block 430). For example, interference detection system 215 generates a map that indicates the identified locations and provides graphical indications of the probabilities that the interference source is proximate to the identified locations.

Figure 9:
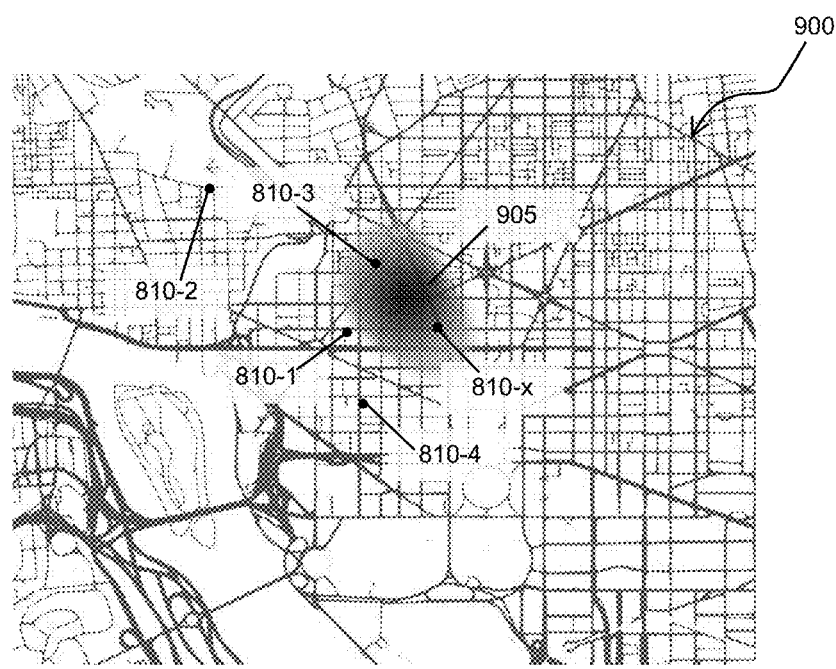
FIG. 9 illustrates an exemplary heat map based on the example of FIG. 6.

FIG. 9 is an example of a heat map 900 generated using the process of block 420. As shown, heat map 900 includes a geographical map of the affected locations and identifies the specific locations 810-1 through 810-x. In addition, heat map 900 includes graphical indicia 905 based on the relative scores and aggregate proximity for each location that indicates a relative probability that the interference source would be found in a particular area. In some embodiments, as shown in FIG. 9, graphical indicia 905 may be provided as an overlay of varying color or opacity to indicate higher and lower probability.

The generated heat map may be used to ascertain the actual location of the interference source and to initiate remediation (block 435). For example, interference detection system 215 may provide or forward the heat map to interference reporting system 220 for delivery to relevant field personnel or other entities associated with the service provider of RAN 205. In a different implementation, interference detection system 215 may interact with locator application 380 on field units 115, to provide locator 380 with information pertaining to locations of potential interference sources.

In the embodiments described above, sector azimuth (i.e., angle of orientation of the antenna) and beam width are not taken into consideration in identifying a possible interference source. This may be the case for wireless stations that broadcast omnidirectional signals having a beam width of 360 degrees. However, in some circumstances, particular sectors of wireless stations may transmit signals in different, selected directions. To account for the antenna directions, the FSPL determined at block 420 may be adjusted by identifying boundaries (e.g., polygons) for each one of the sectors for each wireless station. The FSPL calculation may then be adjusted based on whether a guessed location falls within the boundary for the particular sector. If the guessed location is within the boundary, no adjustments are necessary. However, if the point is not within the boundary, an adjustment is made to the FSPL calculation for the particular location. For example, a +3 dB adjustment may be made to reflect that the particular wireless station is not detecting the interference directly within its transmission beam and detects a lower level of interference than the one calculated without the adjustment.

Figure 10:
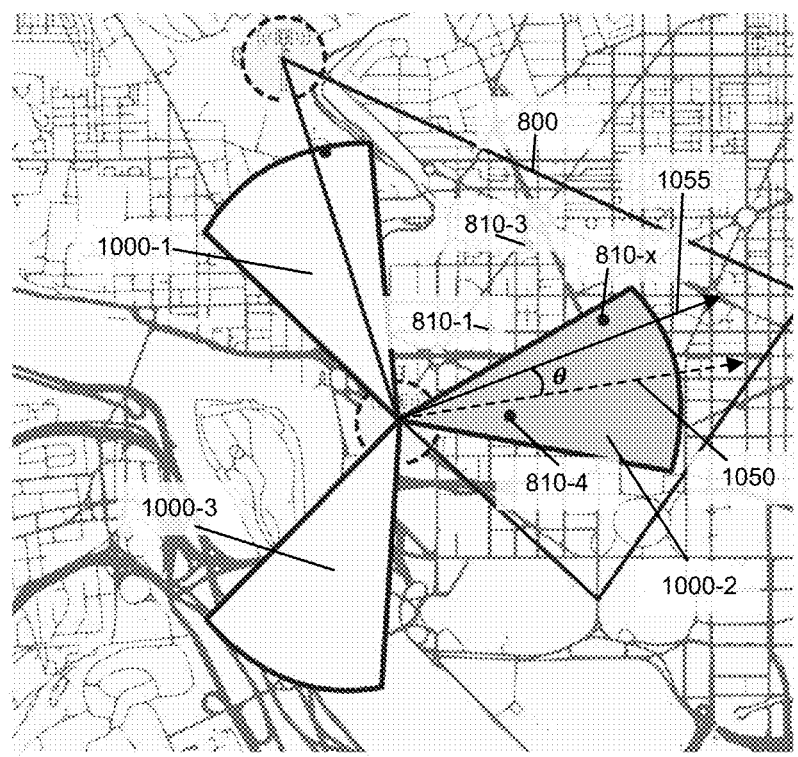
FIG. 10 is a view of a portion, of the map of FIG. 8, illustrating sector boundaries for a wireless station.

FIG. 10 illustrates a portion of FIG. 8 in which wireless station 100-1 cover sectors 1000-1 to 1000-3. Sector 1000-2 is under investigation for the PRBs discussed above and is shaded in gray. In this example, a several of locations 810 are not within the boundaries of sector 1000-2. Consistent with embodiments described herein, the FSPL calculations for these guessed locations may be adjusted by +3 dB for each wireless station, for which the location falls outside of the sector boundary. In this way, lower interference values for locations outside of a particular sector do not unnecessarily impact the RMSE minimization process. The adjustments may result in more accurate location determination.

In some instances, various portions of the heat map may have similar intensities (based on the scores generated in block 425 above), rendering it difficult to identify a particular field search starting point without field expertise or any additional information. Consistent with embodiments described herein, a collocated sector analysis may be performed to estimate a direction in which the interference source is more likely to be located on a per-wireless station basis.

Figure 11:
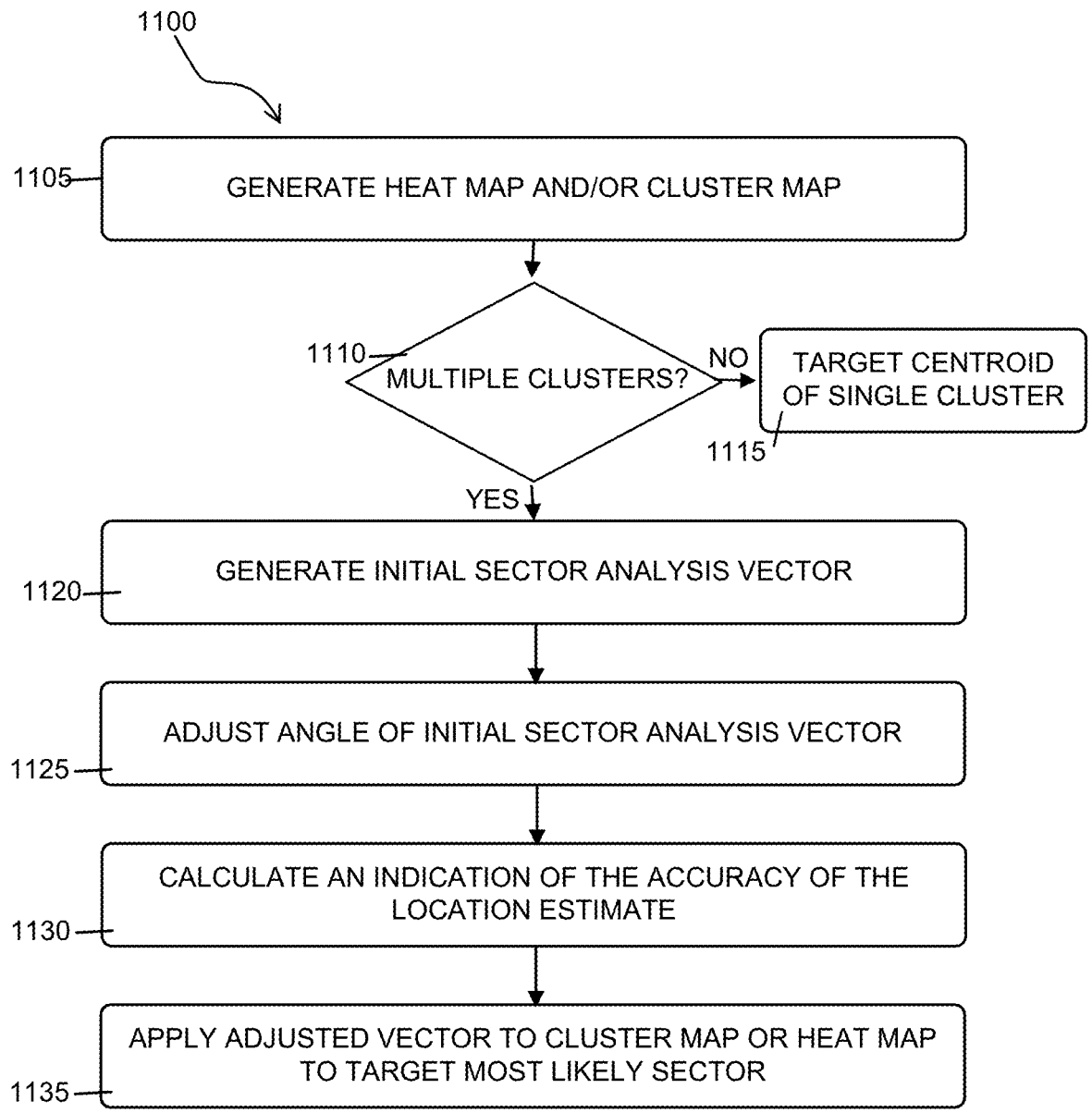
FIG. 11 is a flow diagram illustrating one implementation of a process for sector analysis vector generation consistent with embodiments described herein.

FIG. 11 illustrates an example process 1100 for determining a starting search location based on a collocated sector analysis. In some embodiments, process 1100 may be performed by interference detection system 215. In some embodiments, process 1100 may be performed by, or in conjunction with, one or more other devices or systems, such as wireless station database 210, and/or interference reporting system 220.

In addition to, or in lieu of the heat map described above (e.g., heat map 900), a cluster map may be generated (block 1105) that clusters to possible interference source locations based on a predetermined cluster distance (e.g., 800 meters). Next, it is determined whether multiple clusters have been identified (block 1110). For example, based on K-means clustering, various clusters and related cluster centroids may be generated. If optimized clustering results in a single cluster being identified (block 1110—NO), field searching may be targeted based on the centroid of the identified cluster (block 1115). However, if multiple clusters are identified (block 1110—YES), an initial sector analysis vector may be generated for each wireless station 100 that is experiencing similar interference effects (block 1120).

As described above in relation to FIG. 10, each wireless station 100 that is experiencing similar interference effects (as identified in block 415 above) may have more than one sector pointing in different directions (azimuth) and with different beam widths. Taking this into account, it can be assumed that, like the embodiment of FIG. 10, any sector that is seeing the interference source directly (i.e., within its azimuth and beam width) will most likely show a higher interference power level. Accordingly, for a site that has more than one sector affected by interference, a vector can be initially determined in the direction of the most affected sector's azimuth (e.g., that sector showing the highest interference power level; also referred to as the "main" sector). In the example, of FIG. 10, this vector 1050 (shown as a dashed line) would be directed along the azimuth angle of sector 1000-2, which may be referred to as the main sector.

Next, consistent with implementations described herein, the angle of the initial sector analysis vectors may be steered (i.e., adjusted) based on the interference power levels on the collocated sectors (block 1125). For example, consider wireless station wireless station 100-1 having sectors 1000-1 to 1000-3, as shown in FIG. 10. As discussed above, each sector 1000-1 to 1000-3 has a particular interference power reading for a particular PRB that is experiencing interference effects. A resultant vector 1055 may be generated based on the azimuth, beam width, and interference power level in the main sector (the one with the highest reading) as well as each of the other sectors. In one implementation, the angle adjustment from the main sector azimuth angle is based on a ratio of the main sector interference power level to each of the remaining sector power levels, which may be referred to as the intensity ratio for each of the remaining sectors.

Using the sector example of FIG. 10, assume that for PRB 40 under analysis, sector 1000-2 is the main sector and has an azimuth of 0° and a beam width of 120° and an interference power level of −83 dB, sector 1000-3 has an interference power level of −102 dB, and sector 1000-1 has an interference power level of −90 dB. Using this information, an intensity ratio of 1.23 is calculated for sector 1000-3 (−102/083) and an intensity ratio of 1.08 is calculated for sector 1000-1 (−90/−83). The angle of adjustment (denoted as θ in FIG. 10) may be calculated using the difference between the intensity ratios for sectors 1000-3 and 1000-1, which is 0.15 in this case (1.23-1.08). This difference in ratios is then multiplied with beam width of main sector 1000-2) (120°, resulting in an angle adjustment of 18° (120×0.15) toward sector 1000-1, as represented by adjusted vector 1050 in FIG. 10. Note that if sector 1000-3 had a higher intensity ratio than sector 1000-1, the difference would be negative 0.15, which would result in a −18° angle adjustment toward sector 1000-3.

Once the sector analysis vectors have been adjusted for all wireless stations experiencing interference effects, the vectors may be applied (e.g., overlaid) on the heat map and/or cluster map to help target a likely interference source from among a number of candidate locations or clusters (block 1130).

Figure 12A:
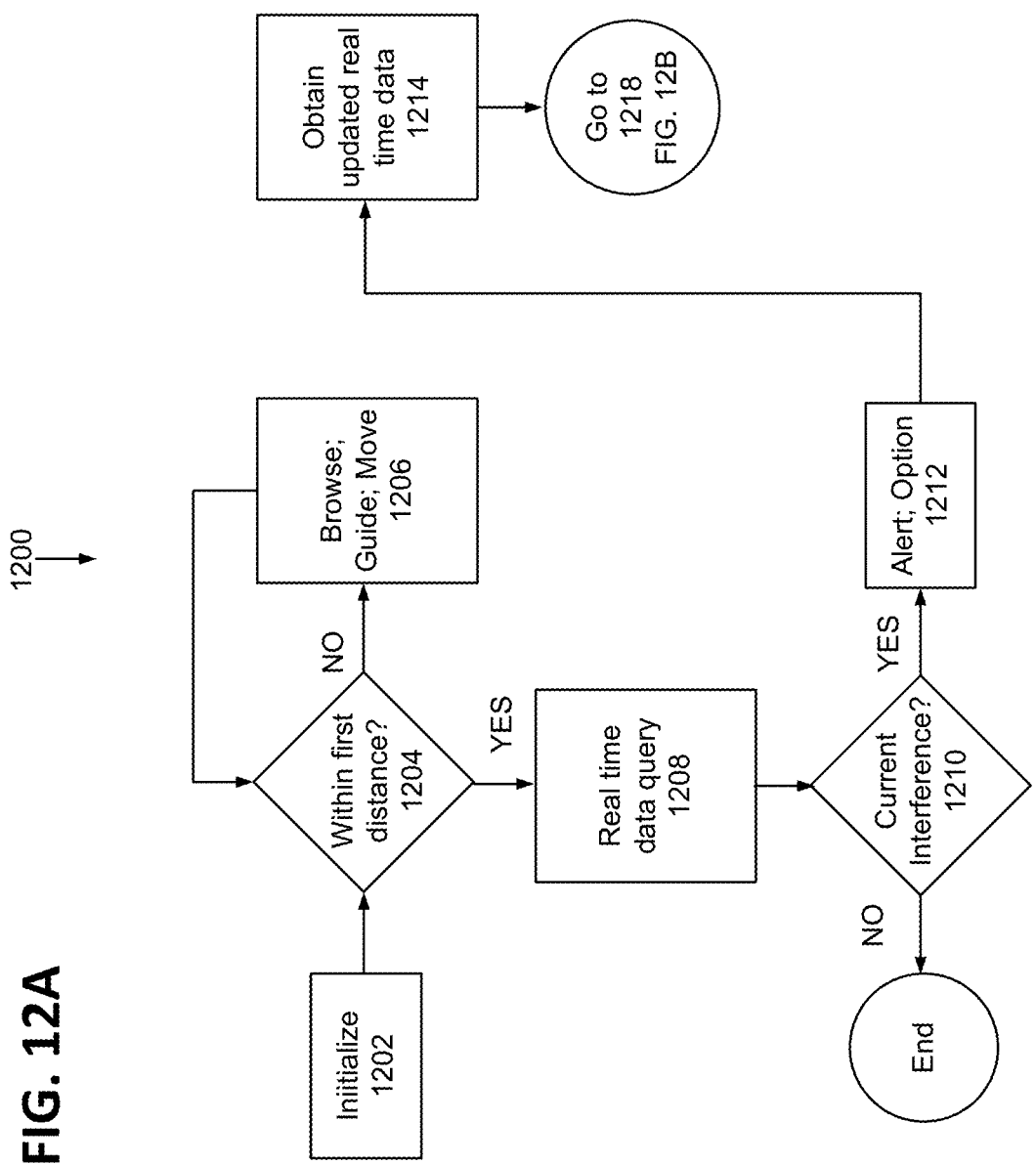
FIGS. 12A and 12B show a flow diagram of an exemplary process that is associated with a field unit and an interference detection system, according to an embodiment.
Figure 12B:
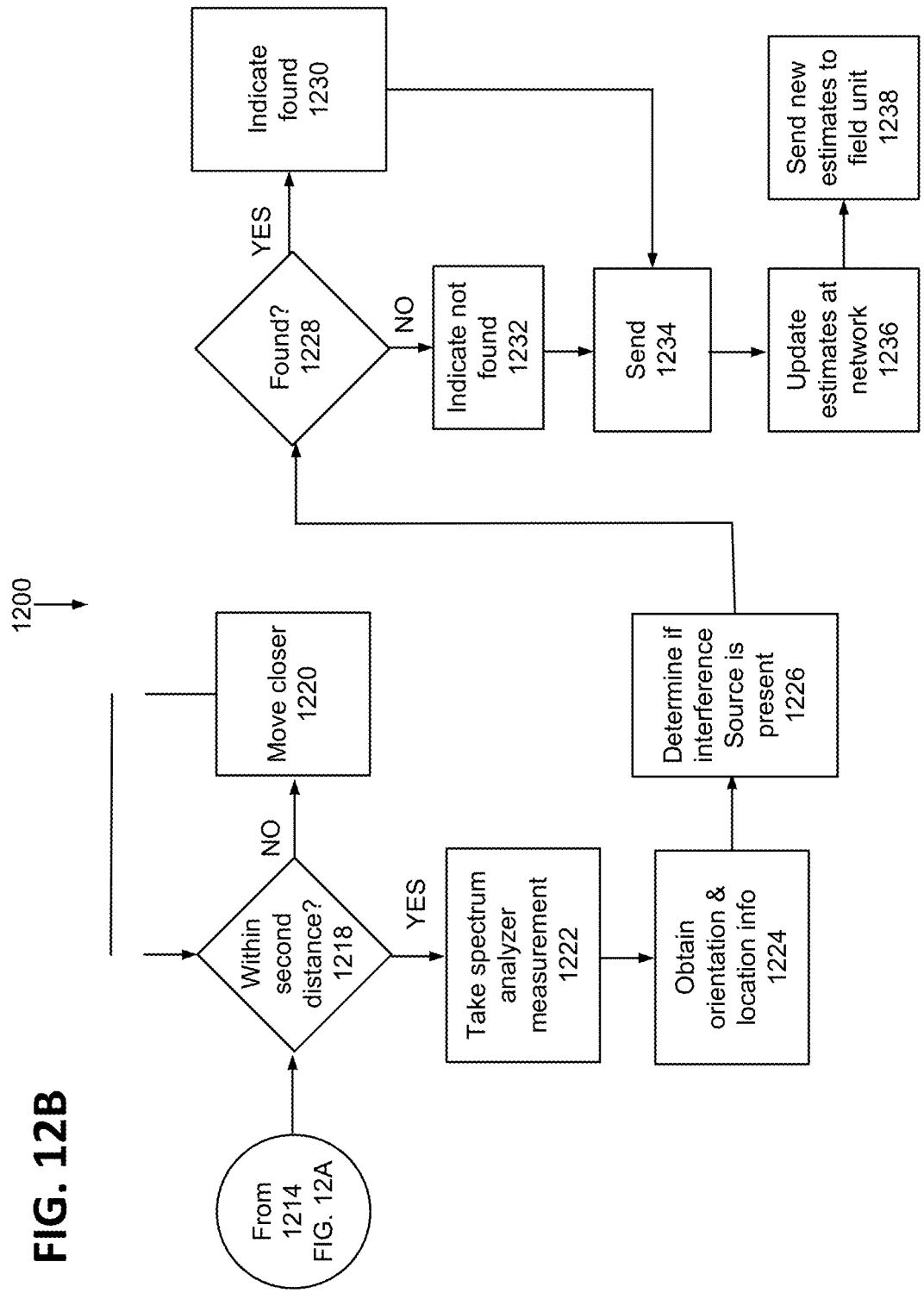

FIGS. 12A and 12B show a flow diagram of an exemplary process 1200 that is associated with field unit 115 and an interference detection system 215, according to an embodiment. In process 1200, field unit 115 may use interference source location estimates determined by interference detection system 215. As shown in FIG. 12A, process 1200 may include initialization of locator 380 of field unit 115 (e.g., hosted on UE 105). During the initialization (e.g., during its launch), locator 380 may contact interference detection system 215 and synchronize its list of estimates of interference source locations with that of interference detection system 215 (block 1202). For example, locator 380 may update the estimates (e.g., obtain new location estimates), obtain indications of time intervals during which the interference sources were active, and/or scores associated with the location estimates (e.g., a score based on the RMSE).

Process 1200 may further include locator 380 determining whether field unit 115 (on which locator 380 is hosted) is close to one of the interference source location estimates based on a first distance threshold (block 1204). If locator 380 determines that the field unit 115 is outside the first threshold distance from any of the location estimates (block 1204: NO), locator 380 may enter a browse mode (block 1206). In the browse mode, the user using field unit 115 can view (e.g., on the display of UE 105 of field unit 115) locations of interference sources, either on a displayed map or an augmented reality view of the environment. Locator 380 may indicate, on the display, the closest potential interference sources. If the user decides to determine whether an actual interference source exists at an estimated location, the user may move closer to the estimated location. In some implementations, field unit 115 may be coupled to an autonomous vehicle and field unit 115 may instruct the vehicle to move toward one of the estimated locations. Thereafter, process 1200 may return to block 1204.

At block 1204, if locator 380 determines that field unit 115 is within the first distance threshold from an estimated location (block 1204: YES), locator 380 may query interference detection system 215, to determine whether there currently is an interference signal at the location of field unit 215 (block 1206). After locator 380 initialization at block 1202, interference detection system 215 may have been collecting interference data and generating location estimates in real time. Thus, upon receipt of the query from locator 380, interference detection system 215 may use its real time location estimates of interference sources, the coordinates of field unit 115 (provided, in the query, by locator 380 to interference detection system 215), and associated time intervals (during which the potential interference is present) to determine whether there currently is interference at the location of field unit 115 (block 1208). Interference detection system 215 may then forward the result of its determination to locator 380 on field unit 115.

Process 1200 may further include locator 380 determining, based on the reply from interference detection system 215, whether there is an interference at the location of field unit 115 (block 1210). If locator 380 determines that there is no interference (block 1210: NO), process 1200 may terminate. In some implementations, process 1200 may return to block 1206 (e.g., locator 380 enters the browse mode).

If locator 380 determines that there currently is an interference (block 1210: YES), locator 380 may alert the user of field unit 115 of the interference and guide the user (block 1212). For example, in some implementations, locator 380 may display an augmented reality view of the environment (e.g., a first-person street view) and provide the user with an option of starting a search for the interference source. If the user does not select the option, process 1200 may terminate (not shown). Assuming that the user selects the option to start a search for the interference source, process 1200 may proceed to block 1214.

At block 1214, locator 380 may obtain updated real time data for the location estimate of the potential interference source (e.g., an updated location estimate, updated score for the location estimate, etc.) and process 1200 may proceed to block 1218 (FIG. 12B). Using the real time data, locator 380 may then determine whether field unit 115 is within a second threshold distance from the real time estimate (block 1218). In some implementations, the second distance threshold may be smaller than the first distance threshold.

If field unit 215 is further than the second distance from the potential source (block 1218: NO), locator 380 may guide the user toward the estimated location. For example, locator 380 may display the direction in which the user may move to be closer to the real time location estimate (block 1220). If the field unit 115 is coupled to an autonomous vehicle, field unit 115 may cause the vehicle to move closer to the real time location estimate. Process 1200 may then return to block 1218.

At bock 1218, if locator 380 determines that field unit 115 is within the second threshold distance from the estimate location (block 1218: YES), locator 380 may cause field unit 115 to take one or more measurements in a particular direction and in a particular frequency range (as specified by the data from interference detection system 215) (block 1222). That is, locator 380 may use the spectrum analyzer interface 386 to cause spectrum analyzer 370 to take a measurement in a particular frequency range and in a particular direction.

Process 1200 may further include locator 380 obtaining the location coordinates of field unit 115 and the orientation of field unit 115 (block 1224). Based on the location information and orientation information of field unit 115 and the measurements from spectrum analyzer 370, locator 380 may determine whether an interference source is present at or near the location of field unit 115 (block 1226). For example, if the spectrum analyzer measurement indicates a strong interference signal (e.g., power in the spectrum is greater than a power threshold; a signal whose power is equal to or greater or than the interference detected by interference detection system 215 by 10 dB; etc.), locator 380 may determine that an interference source exists at the location of field unit 115 and conclude that an interference source corresponding to the location estimate provided by interference detection system 215 has been found.

If locator 380 determines that the interference source is found (block 1228: YES), locator 380 may indicate in a message, to be forwarded to interference detection system 215, that the interference source has been found at a particular location (block 1230). The location may be close to the location estimate provided by interference detection system 215 (e.g., within the second threshold distance). In addition, locator 380 may include, in the message, the field measurements and the location data associated with field unit 115. From block 1230, process 1200 may proceed to block 1234. Referring back to block 1228, if locator 380 determines that a source is not found (block 1228: NO), locator 380 may indicate, in a message to interference detection system 215, that the interference source was not found (block 1232). Locator may send the message to interference detection system 215 (block 1234).

In some implementations, due to physical barriers or obstacles, field unit 115 may not be able to move close enough to a location estimate provided by interference detection system 215 to determine whether there is an interference source close to the specified location. However, in some of those situations, the user may be able to identify the interference source by visual inspection. In such instances, the user may input an indication that an actual source of interference is close to or at the estimated location. The user may take field measurements using field unit 115. The user may then send a message which includes the measurement data and an indication that the interference source is found based on visual inspection, at or near the estimated location, to interference detection system 215.

When interference detection system 215 receives, from field unit 215, the measurement data and/or an indication of whether an interference source has been found close to a location estimate, interference detection system 215 may use the received measurements from field unit 115 (including the direction in which the measurements were taken), the real-time data (e.g., data provided by wireless stations 100), and the location information to recompute or generate an updated estimate of the location of the interference source (block 1236). Interference detection system 215 may store the new estimate along with the measurement data and send the new estimate to field unit 115 (block 1238), to provide field unit 215 with the updates.

The foregoing description of implementations provides illustration and description but is not intended to be exhaustive or to limit the invention to the precise form disclosed. Modifications and variations are possible in light of the above teachings or may be acquired from practice of the invention. For example, while a series of blocks have been described with respect to FIGS. 4, 7, 11, 12A, and 12B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
   a device configured to:
   receive, from a network, an estimate of coordinates of a location of a potential interference source;
   determine, based in the estimate, whether the system is within a first threshold distance from the location;
   when the system is within the first threshold distance from the location, obtain real-time interference data from the network;
   determine, based on the real-time interference data, whether a source of interference exists near a first location that is within a second distance from a second location specified by the real-time interference data, wherein when determining whether the source of interference exists, the device is further configured to:
   determine a power level in a particular spectrum; and
   determine whether the power level indicates presence of interference; and
   send a reply that indicates a result of the determination to the network.

2. The system of claim 1, wherein when the device determines the power level, the device is configured to one of:
   receive, from a user, input that indicates the power level; or
   obtain a reading, which indicates the power level, from a spectrum analyzer device.

3. The system of claim 2, further comprising the spectrum analyzer device.

4. The system of claim 1, wherein the device is further configured to:
   when the system is not within the first threshold distance from the location, perform one or more of:
   render, on a display screen of the system, an environment that includes the potential source of interference at the location; or
   cause the system to move toward the location.

5. The system of claim 4, wherein when the device renders the environment, the device is configured to:
   render, on the display screen, an augmented reality view of an area surrounding the system.

6. The system of claim 1, wherein when the device determines, based on the real-time interference data, whether a source of interference exists near the first location, the device is configured to:
   determine, based on the real-time interference data, whether interference is currently present at the location.

7. The system of claim 6, wherein the device is further configured to:
   when no interference is currently present at the location, cause the system to move to a different location.

8. The system of claim 1, wherein when the device determines whether a source of interference exists, the device is configured to:
   obtain measurement data that includes location data, orientation data, and spectrum power measurement data,
   wherein the device is further configured to:
   send the measurement data to the network.

9. The system of claim 8, wherein the network is configured to:
   determine a new estimate of a location of the source of interference based on the measurement data received from the device and real-time interference data; and
   send the new estimate to the device.

10. A method comprising:
    receiving, from a network, an estimate of coordinates of a location of a potential interference source;
    determining, based in the estimate, whether a system is within a first threshold distance from the location;
    when the system is within the first threshold distance from the location, obtaining real-time interference data from the network;
    determining, based on the real-time interference data, whether a source of interference exists near a first location that is within a second distance from a second location specified by the real-time interference data, wherein determining whether a source of interference exists comprises:
    determining a power level in a particular spectrum; and
    determining whether the power level indicates presence of interference; and
    sending a reply that indicates a result of the determination to the network.

11. The method of claim 10, wherein determining the power level includes one of:
    receiving, from a user, input that indicates the power level; or
    obtaining a reading, which indicates the power level, from a spectrum analyzer device.

12. The method of claim 11, wherein the system includes the spectrum analyzer device.

13. The method of claim 10, further comprising:
    when the system is not within the first threshold distance from the location, performing one or more of:
    rendering, on a display screen of the system, an environment that includes the potential source of interference at the location; or
    causing the system to move toward the location.

14. The method of claim 13, wherein the rendering the environment includes:
    rendering, on the display screen, an augmented reality view of an area surrounding the system.

15. The method of claim 10, wherein determining whether a source of interference exists near the first location comprises:
    determining, based on the real-time interference data, whether interference is currently present at the location.

16. The method of claim 10, wherein the first location includes a current location of the system.

17. A non-transitory computer-readable medium comprising processor executable instruction, that when executed by a processor in a system, cause the processor to:
- receive, from a network, an estimate of coordinates of a location of a potential interference source;
- determine, based in the estimate, whether the system is within a first threshold distance from the location;
- when the system is within the first threshold distance from the location, obtain real-time interference data from the network;
- determine, based on the real-time interference data, whether a source of interference exists near a first location that is within a second distance from a second location specified by the real-time interference data, wherein when the processor determines whether a source of interference exists, the processor is further to:
  - determine a power level in a particular spectrum; and
  - determine whether the power level indicates presence of interference; and
- send a reply that indicates a result of the determination to the network.

18. The non-transitory computer-readable medium of claim 17, wherein, when the processor determines the power level, the processor is configured to one of:
- receive, from a user, input that indicates the power level; or
- obtain a reading, which indicates the power level, from a spectrum analyzer device.

19. The non-transitory computer-readable medium of claim 17, wherein, when the system is not within the first threshold distance from the location, the processor is further configured to perform one or more of:
- render, on a display screen of the system, an environment that includes the potential source of interference at the location; or
- cause the system to move toward the location.

20. The non-transitory computer-readable medium of claim 19, wherein, when the processor renders the environment, the processor is configured to:
- render, on the display screen, an augmented reality view of an area surrounding the system.

* * * * *